United States Patent [19]
Heitkamp

[11] Patent Number: 5,460,864
[45] Date of Patent: Oct. 24, 1995

[54] HIGH TEMPERATURE 2000 DEGREES-F BURN-THROUGH RESISTANT COMPOSITE SANDWICH PANEL

[75] Inventor: Richard Heitkamp, Long Beach, Calif.

[73] Assignee: Ciba-Geigy Corporation, Ardsley, N.Y.

[21] Appl. No.: 57,837

[22] Filed: May 7, 1993

[51] Int. Cl.⁶ .................................................. B32B 3/12
[52] U.S. Cl. ........................ 428/116; 52/793.1; 156/197; 156/292; 428/920
[58] Field of Search .................................. 428/116, 118, 428/73, 920, 921; 181/292; 52/806; 156/197, 292

[56] References Cited

U.S. PATENT DOCUMENTS

| | | | |
|---|---|---|---|
| 2,477,852 | 8/1949 | Bacon | 428/116 |
| 2,870,857 | 1/1959 | Goldstein | 428/116 X |
| 3,502,171 | 3/1970 | Cowan | 428/116 X |
| 4,043,862 | 8/1977 | Roberts | 428/334 X |
| 4,251,579 | 2/1981 | Lee et al. | 428/116 X |
| 4,271,228 | 6/1981 | Foster et al. | 428/237 X |
| 4,284,443 | 8/1981 | Hilton | 428/116 X |
| 4,304,376 | 12/1981 | Hilton | 428/116 X |
| 4,594,266 | 6/1986 | Lemaire et al. | 427/295 X |
| 4,937,125 | 6/1990 | Sanmartin et al. | 428/116 |
| 4,956,217 | 9/1990 | Heitkamp | 428/116 |
| 4,999,239 | 3/1991 | Iacoviello et al. | 428/290 X |
| 5,106,668 | 4/1992 | Turner et al. | 428/116 |
| 5,336,348 | 8/1994 | Mindler | 428/288 X |

FOREIGN PATENT DOCUMENTS

| | | |
|---|---|---|
| 0050448 | 4/1982 | European Pat. Off. . |
| 0501271 | 9/1992 | European Pat. Off. . |
| 3542289 | 6/1987 | Germany . |
| 3823967 | 1/1990 | Germany . |

Primary Examiner—Henry F. Epstein
Attorney, Agent, or Firm—Luther A. R. Hall

[57] ABSTRACT

A composite sandwich panel structure having first and second honeycomb core layers and fire barrier membranes separating the honeycomb core layers as well as forming facing skins provides protection from burn-through after 15 minutes of subjection to a 2000° F. front side flame impingement at 10.5 btu/m² heat flux density, with a 110° F. average off-surface temperature 12" off of the backside of the panel. The facing skins on the outside of the honeycomb core layers are preferably formed by a layer of vermiculite film together with a layer phenolic prepreg. The center septum layer separating the first and second honeycomb core layers can be an inorganic fiber membrane, with a layer of phenolic prepreg on both sides thereof, and/or a layer of vermiculite film or other suitable materials providing a fire barrier. The honeycomb core layers are preferably made of a nylon paper honeycomb having a coating that itself forms a fire barrier, such as a coating of 80–96% sodium silicate, 1–4% vermiculite HTS and 2–15% H₂O based phenolic resin.

6 Claims, 1 Drawing Sheet

HIGH TEMPERATURE 2000 DEGREES-F BURN-THROUGH RESISTANT COMPOSITE SANDWICH PANEL

BACKGROUND OF THE INVENTION

1) Field of the Invention

The present invention relates to composite sandwich panels employing honeycomb cores, and in particular relates to such composite panels designed to be used in environments requiring fire or flame resistance, or fire protection.

2) State of the Prior Art

Standard low FST (Flame, Smoke and Toxicity) composite panel structures are normally made of phenolic prepreg skins on Nomex® honeycomb core. An example of this can be found in Applicant's own U.S. Pat. No. 4,956,217. This patent provides a laminate structure that comprises a honeycomb core structure with facing sheets bonded thereto, the core being treated with a silica impregnant/coating to impart improved flame resistance and to reduce heat transmission and toxic emissions upon exposure of the core to direct or indirect heat, flame and/or a pirolytic environment. The use of the honeycomb core combined with rigid skin panels forms a sandwich structure providing semi-structural strength. In addition, this patent provides a honeycomb composite structure that exhibits excellent heat and flame barrier properties, while still retaining adequate mechanical strength.

U.S. Pat. No. 4,251,579 to Lee et al. discloses an alternate fire protection panel, wherein the cells of a honeycomb core are filled with a fire-extinguishing fluid. Thus, any projectiles impacting and passing through the facing sheets would cause the fire-extinguishing fluid to be rapidly liberated to suppress or extinguish any fire caused by entry of the projectile.

U.S. Pat. No. 5,106,668 to Turner et al. provides a multi-layer honeycomb core structure having a plurality of core layers of different densities and thicknesses. The emphasis in this patent is the maintenance of a low mass density while providing good strength in resistance to compressive bending stresses and high resistance to damage from drops or other impacts, as well as resistance to water ingression.

U.S. Pat. No. 4,937,125 to Sanmartin et al. provides another multi-layer core sandwich structure that is resistant to both impact and thermal aggressions. A synthetic cellular material having a low thermal conductivity coefficient provides one layer, while another layer is made up of an off-the-shelf extruded polystyrene polyvinylchloride, or polyethene plate.

However, none of the above provides a composite sandwich panel that provides a 15 minute burn-through protection at 10.5 btu heat flux density at 2000° F.

SUMMARY OF THE INVENTION

An initial object of the present invention is to provide a composite sandwich panel structure that provides 2000° F. (1950° F. ±50° F.) burn-through resistance. In particular, it is desired to provide a panel which provides 15 minute burn-through protection at 10.5 or higher btu/m$^2$ heat flux density at 2000° F. More particularly, it is an object of the present invention to provide a non-structural fire barrier composite sandwich panel of low FST value that provides 2000° F. fire protection for use in fire containment, personnel fire shelters, fire proof document containers, off-shore oil rig crew's quarters structures, firewalls for engines and firemen's portable shields, among other applications.

A composite sandwich panel structure according to the present invention is achieved by the provision of a plurality of honeycomb core layers and a plurality of fire barrier membranes disposed both between the honeycomb core layers as a septum and on the face of the honeycomb core layers as panel skins. More particularly, the present invention is achieved by the provision of a composite panel structure which has the properties of no burn-through after 15 minutes of subjection of a 2000° F. front side flame impingement at at least 10.5 btu/m$^2$ heat flux density with a 110° F. average off-surface temperature 12" off of the backside of the panel (average T after 15 minutes based on a number of tests).

The fire barrier membrane, and in particular the septum, may comprise a layer of inorganic fiber membrane, or inorganic paper, or a layer of vermiculite film, or both a layer of inorganic fiber membrane and a layer of vermiculite film.

Further, the septum layer of inorganic fiber membrane and/or vermiculite film preferably has a layer of phenolic prepreg on both sides thereof, adjacent the honeycomb core layers. Further, the layer of inorganic paper provided together with the layer of vermiculite film may also have a layer of phenolic prepreg therebetween.

Preferably, the layer of vermiculite film comprises 30–100% vermiculite and 0–60% carrier, the carrier being a glass or quartz fabric or mat, or other low or non-flammable support.

In a preferred version of the composite sandwich panel according to the present invention, there are two honeycomb core layers provided, with a center septum provided therebetween made of inorganic fiber membrane or paper. Further, the facing skins on the outsides of the honeycomb cores are preferably vermiculite film. The layer of phenolic prepreg is provided between each vermiculite film layer and the respective honeycomb core, and on both sides of the inorganic paper used as the center septum.

Further, the honeycomb core layers preferably comprise a honeycomb core having a thickness of 0.25–1.00" with a 4, 6, 8, 10 or 12 pound density. In the preferred version described above, both of the honeycomb core layers preferably has an 8 pound density and a thickness of ½".

DETAILED DESCRIPTION OF THE PREFERRED EMBODIMENT

Figure 1:
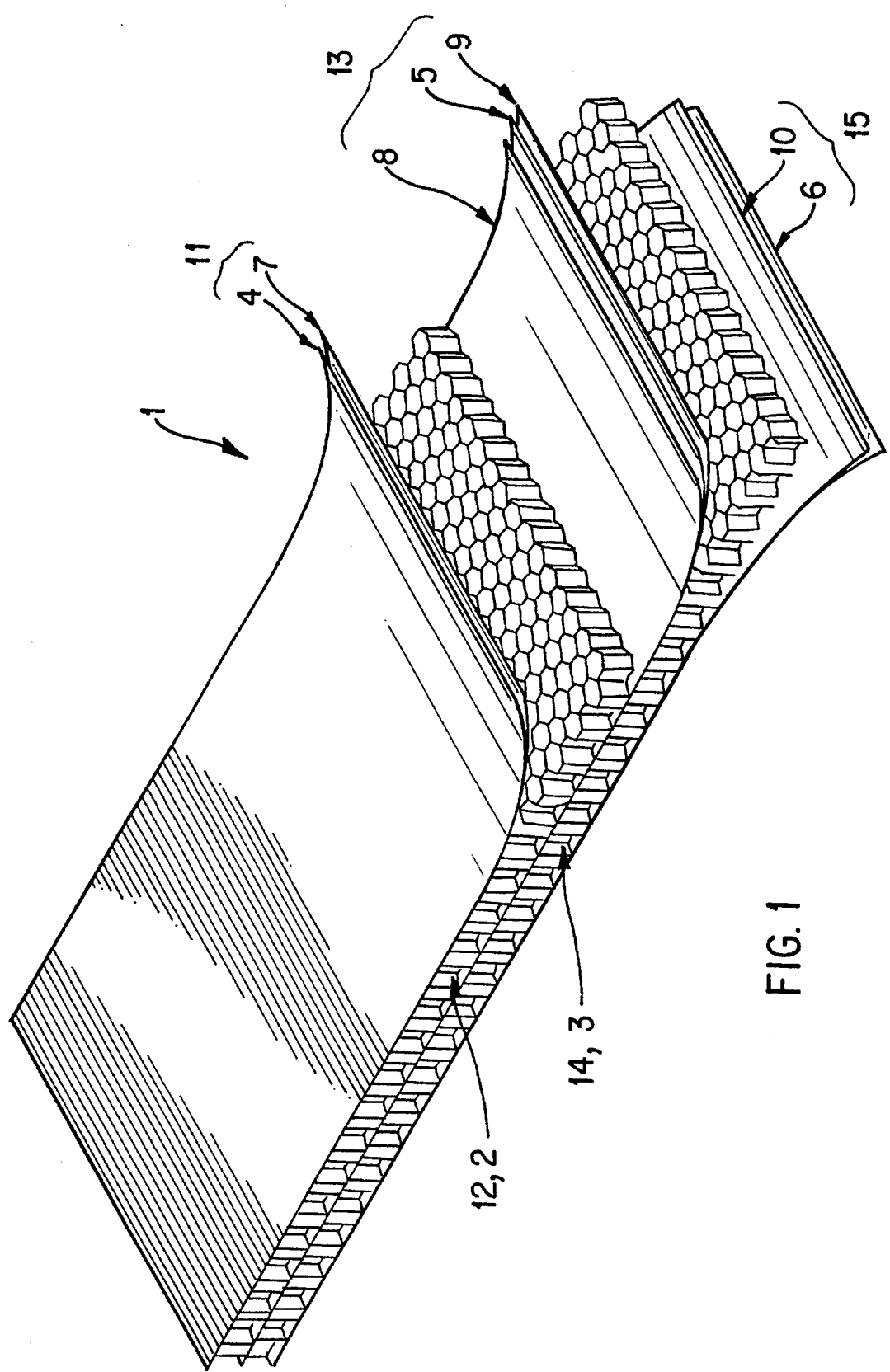
FIG. 1 is a perspective view of a composite sandwich panel according to the present invention that is separated at one end.

FIG. 1 illustrates the general arrangement of a composite sandwich panel 1 according to the present invention. Typically, two honeycomb core layers 2 and 3 will be provided, separated by a center septum 5. Facing skins 4 and 6 are provided on the front and rear surfaces, respectively, of the sandwich panel 1. The center septum 5 and the facing skins 4 and 6 are, preferably, each fire barrier membranes. In addition, layers 7, 8, 9 and 10 are preferably a prepreg, such as a low FST phenolic prepreg. Adhesive, however, may be substituted for the prepreg at the center septum 5, replacing layers 8 or 9.

The fire barrier membranes to be used with the present invention can be made of a number of different materials, including both an inorganic fiber membrane, or inorganic paper, and a vermiculite film developed for this invention.

Inorganic paper to be employed in the present invention can be used for either a facing skin or the septum in a thin layer, on the order of 0.01" to 0.035" thick. Inorganic fiber membrane compositions may contain glass, fiber and flake, polyimide fiber, polyamide fiber, phenolic resin, melamine resin, mica of various types and grades, vermiculite, silicon carbide fiber, asbestos fiber, potassium titanate, soda ash, ammonium polyphosphate, aluminum trihydrate, polybenzamidazole, zinc borate, magnesium carbonate, magnesium hydroxide, red phosphorous, melamine phosphorous, zinc stannate, zinc mydroxustannate, and/or sodium or potassium silicate. One inorganic paper that is preferred for the present invention is that made by Hollingsworth—Vose Company of E. Walpole, Mass., part Nos. EX 100V (light weight) and EW 656 (heavy weight). EX 100V is 125 to 150 basis weight, and EW 656 is 350–450 basis weight (basis weight= lbs/3000 ft$^2$). Other inorganic fiber membranes that may be suitable include Nextel®, a woven quartz-type material available from 3-M Company.

The inorganic fiber membrane serves as a fire barrier in the composite sandwich panel, and is, preferably, itself capable of preventing burn-through after 15 minutes subjection to a 2000° F. flame front at 10.5 btu/m$^2$ heat flux density.

Another material contemplated for use as a fire barrier membrane, or a flame barrier, with the present invention is the above-mentioned vermiculite film. Vermiculite is chemically delaminated mica of a specific grade. It separates into individual flakes, which have an electrical affinity and form a layered film with overlapping flakes of a high aspect ratio, up to 10,000 to 1. The vermiculite film is both reflective and a fire barrier, and when used as a facing skin or surface barrier, is highly effective in preventing flame penetration into the core structure, and thus provides a highly heat reflecting surface facing. The preferred vermiculite film for the vermiculite, film flame barrier according to the present invention is made as a water-based slurry, sold by W. R. Grace Co. as vermiculite HTS, and has the following solid content components:

| Formulation Component | % of Component |
| --- | --- |
| Vermiculite - Flake, Dry or dispersion. High aspect ratio 500 to 10,000 | 30 to 100 |
| Carrier - Glass or Quartz mat of fabric | 0 to 60 |
| Aminosilane coupling agent | 0 to 5 |
| Intumesing vermiculite dry | 0 to 50 |
| Organic binder | 0 to 15 |

The film thickness of the vermiculite mica film flame barrier will be 0.005 to 0.030".

As noted above, the preferable material used between the facing skins 4 and 6 and the center septum, and the cores 2 and 3, is a layer of phenolic prepreg. A preferred formulation for the phenolic prepreg is Ciba 7273-1 resin formula (Ciba-Geigy Corporation, Ardsley, N.Y.), with the following formulation:

| Component of Phenolic Prepreg | % of Component |
| --- | --- |
| Phenol Formaldehyde resin | 30 to 70 |
| Flame retardant ammonium polyphosphate | 0 to 30 |
| Flame retardant aluminum trihydrate | 0 to 30 |
| Glass fabrics Hybrid, E or S glass woven unidirectional, satin, plain or leno weave, 0.5 to 12.0 oz./square yard | 20 to 70 |

Alternatives to the above-mentioned vermiculite film and inorganic film membrane can, of course, be found for the fire barrier membranes. One such alternative, which could also be supplemental to the above-mentioned membranes, is a glass fabric faced silica or quartz fiber stitched fabric assembly ply. This material could be used either as a facing skin or as the center septum. One preferred type of such a material is known as Refratex™, designated part no BT 13092, available from Brochier of Lyon, France. An additional septum material may be an intumescent coated fiberglass fabric material, known as, and available from, "No-Fire" of Santa Ana, Calif., and designated by part nos. 2025, 7781 or 16781.

The preferred honeycomb core to be used with the present invention is known as Cibarrier®. This type of core corresponds generally to that disclosed in the above-discussed U.S. Pat. No. 4,956,217, which is incorporated herein by reference. This core generally comprises E-78 commercial Nomex® (nylon paper), or any other suitable honeycomb core material, with a coating that is 80–96% sodium silicate, 1–4% vermiculite HTS, and 2–15% H$_2$O base phenolic resin. Potassium silicate can be used as an alternative to sodium silicate. It is noted that the vermiculite acts to assist in resin distribution in the core dipping, reinforces the sodium silicate, and is in itself a fire barrier and is an impermeable film former to retard hydroscopy of the Cibarrier® coating, adding significantly to the flammability reduction of the core system.

The core is preferably a ⅛" cell honeycomb made of 2-mil Nomex®, but ³⁄₁₆" and ¼" cells may be used. Normal Nomex® paper thickness is 2-mil, but 1½ or 3-mil may be used. E-78 commercial core is generally preferred for cost purposes, because it is 38% cheaper than 412 aerospace grade. Further, the use of E-78 Nomex® in the Cibarrier® negates the only objection in aircraft applications. E-78 alone has an unacceptable afterglow, but when used in Cibarrier® the element of afterglow is not relevant, because the core contributes virtually nothing to the burn, and the entire core structure is protected by the Cibarrier® coating. Therefore, E-78 2-mil Nomex® is generally preferred, but a core made of other material may also be used.

The H$_2$O base phenolic resin used with the Cibarrier® system discussed above was selected for stability and compatibility. Other phenolic resins may potentially be substituted, however. In any case, the resin must be compatible with the sodium silicate, go into true solution and possess a mix life stability of appropriate time. The function of the H$_2$O phenolic resin is two-fold. First, the resin provides a modest amount of mechanical strength, and second, and primarily, it has the ability to be cured in the small quantity used. The resin acts as a resinous binder, curing the entire Cibarrier® solution, promoting adhesion to the core as well as cohesion of the vermiculite and sodium silicate into a homogenous cured coating. The Cibarrier® cure temperature of 280° F. maximum is sufficient in order to cure the H$_2$O phenolic and form a bound coating, while not significantly restricting the inherent intumescence of the sodium silicate at elevated temperatures.

Preferably there are two Cibarrier® honeycomb core layers, 0.25–1.00" thick, in 4, 6, 8, 10 or 12 pound density, and preferably with an ⅛" cell size, as noted above. However, suitable variations can, of course, be made, depending on the particular application to which the composite sandwich panel is to be applied.

EXAMPLES

Preferred examples of the construction of the composite sandwich panel according to the present invention will be described below. In describing the preferred examples, reference will be made to the preferred construction of an outside or exposed surface skin 11, from surface to center, a first core layer 12, a center septum assembly 13, a second core layer 14 and a bottom or backside surface skin 15, from core to back surface.

| | Outside or Exposed Surface Skin 11 (From Surface to Center) |
|---|---|
| Type A | 1 Layer Vermiculite Film/Glass 0.010" to 0.030" thick +/– .003" |
| | 1 Layer Phenolic/Glass 0.010" Prepreg |
| Type B | 1 Layer Vermiculite Film/Glass .010" to 0.030" .003 |
| | 1 Layer Phenolic/Glass 0.005" prepreg |
| | 1 Layer Inorganic paper .010" to 0.035" +/–.002 |
| | 1 Layer Phenolic/Glass .010" Prepreg |
| Type C | 1 Layer Inorganic paper .010" to 0.035" +/– .002 |
| | 1 Layer Phenolic/Glass .010" Prepreg |
| Next - First core Layer 12, Cibarrier$^R$ core 0.25 to 1.00" thick in 4, 6, 8, 10 or 12 pound density, ⅛" or 3/16" cell. |
| Center Septum Assembly |
| Type D | 1 Layer Phenolic/lightweight glass bond ply 0.005" |
| | 1 Layer Inorganic paper 0.010" to 0.035" +/– 0.002 |
| | 1 Layer Phenolic/lightweight glass bond ply 0.005" |
| Type E | 1 Layer Phenolic/lightweight glass bond ply 0.005" |
| | 1 Layer Vermiculite/Glass 0.010" to 0.030" .003 |
| | 1 Layer Phenolic/lightweight glass bond ply 0.005" |
| Type F | 1 Layer Phenolic/lightweight glass bond ply 0.005" |
| | 1 Layer Vermiculite/glass 0.010" to 0.030" +/– .003 |
| | 1 Layer Phenolic/lightweight glass bond ply 0.005" |
| | 1 Layer Inorganic paper 0.010" to 0.030" +/– .002 |
| | 1 Layer Phenolic/lightweight glass bond ply 0.005" |
| Next-Second Core layer 14, Cibarrier$^R$ core 0.25 to 1.00" thick in 4, 6, 8, 10 or 12 pound density, ⅛" or 3/16" cell. |
| Bottom or Backside Surface Skin 15 (From Core to Back Surface) |
| Type G | 1 Layer Phenolic/glass 0.010" |
| | 1 Layer Vermiculite 0.010 to 0.030" +/– .003 |
| Type H | 1 Layer Phenolic/glass 0.010" |
| | 1 Layer Refratex 0.1011 +/– .01 |
| Type I | 1 Layer Phenolic/glass 0.010" |
| | 1 Layer Inorganic paper 0.010" to 0.035" +/– .002 |
| | 1 Layer Phenolic/lightweight glass bond ply 0.005" |
| | 1 Layer Vermiculite 0.010" to 0.030" +/– .003 |

The above represents some of an almost endless number of possible combinations of elements in the construction of the composite sandwich panel according to the present invention. Improved performance is possible by crushing a ½" core to ¼" or ⅛" thick as the first core layer, using different core densities altogether, altering the inorganic paper and vermiculite layers, etc.

The most preferred construction for a 1" composite sandwich panel providing 2000° F. at 10.5 btu/m$^2$ heat flux density protection according to the present invention is:

1. Top or exposed skin—Type A
2. First core layer—8# ½" thick
3. Center Septum—Type D
4. Second core layer—8# ½" thick
5. Bottom or backside skin—Type G This construction combines adequate performance with the lowest cost to produce.

Of course, the final construction of any composite sandwich panel will depend on its application and performance requirements in a particular environment. A distinct possibility is that a stronger structural construction might be required, in which case the second ½" of the sandwich might use two layers of phenolic/glass on both sides of the core, with the same associated elements of vermiculite and inorganic paper. This simply provides more structural glass skins on both sides of the bottom or backside half of the sandwich.

The composite sandwich panel according to the present invention is a structure which can be contoured, and is unique in that the composite design can accommodate most any environmental demand relative to fire containment. Each of the components plays a synergistic part in the overall design and construction. One significant advantage is that all of the components are cure compatible, and each panel assembly is a one-shot single cure, regardless of the number or sequence of elements.

Thus the present invention provides a composite sandwich panel suitable for 2000° F. exposure. The primary elements discussed above are the vermiculite film and the inorganic fiber membrane, or inorganic paper. However, there are, of course, other possible components which may help to accomplish the same objective of making the composite sandwich panel resistant to burn-through up to 15 minutes at 2000° F. and 10.5 btu/m$^2$ heat flux density. Some of these components are a silica fiber mat, silica fiber woven fabric and other mica types which intumesce and can be combined with the vermiculite mica solutions or dry powder forms or films.

Further modifications of the above composite sandwich panel will occur to those of ordinary skill in the art without departing from the scope of the present invention as defined by the appended claims, and, as such, should be considered a part of this invention.

I claim:

1. A composite panel structure, comprising:

first and second honeycomb core layers; and means for preventing said composite panel structure from being burned-through, and a backside off-surface temperature 12" off of the backside from going substantially above 110° F., after 15 minutes of impinging the front side with a 2000° F. flame at 10.5 btu/m$^2$ heat flux density, said means including a center septum disposed between said first and second honeycomb core layers and facing skins on sides of said honeycomb core layers opposite said center septum defining the front and back sides.

2. The composite panel structure of claim 1, wherein said center septum and said facing skins are fire barrier membranes.

3. The composite panel structure of claim 2, wherein said center septum comprises an inorganic fiber membrane.

4. The composite panel structure of claim 3, wherein said facing skins comprise vermiculite films.

5. The composite panel structure of claim 4, wherein said center septum and said facing skins each further comprise a phenolic prepreg layer.

6. The composite panel structure of claim 5, wherein said honeycomb core layers are made of a nylon paper honeycomb having a coating that is 80–96% sodium silicate, 1–4% vermiculite HTS and 2–15% $H_2O$ base phenolic resin.

* * * * *